(12) United States Patent
Lopez et al.

(10) Patent No.: US 8,263,290 B2
(45) Date of Patent: *Sep. 11, 2012

(54) PRECIOUS METAL OXIDE CATALYST FOR WATER ELECTROLYSIS

(75) Inventors: Marco Lopez, Frankfurt (DE); Andreas Schleunung, Grossostheim-Rangheim (DE); Peter Biberbach, Rodenbach (DE)

(73) Assignee: Umicore AG & Co. KG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/150,310

(22) Filed: Jun. 1, 2011

(65) Prior Publication Data

US 2011/0223523 A1  Sep. 15, 2011

Related U.S. Application Data

(62) Division of application No. 10/595,480, filed on Feb. 8, 2007, now Pat. No. 7,976,989.

(30) Foreign Application Priority Data

Oct. 29, 2003 (DE) .................................. 103 50 563
Oct. 29, 2004 (WO) ................. PCT/EP2004/012290

(51) Int. Cl.
| H01M 4/02 | (2006.01) |
| H01M 4/13 | (2010.01) |
| H01M 4/36 | (2006.01) |
| H01M 4/58 | (2010.01) |
| H01M 4/90 | (2006.01) |
| H01M 8/00 | (2006.01) |
| C25F 7/00 | (2006.01) |
| B01J 20/00 | (2006.01) |
| B01J 21/00 | (2006.01) |
| B01J 21/04 | (2006.01) |
| B01J 23/00 | (2006.01) |

(52) U.S. Cl. ..................... 429/528; 429/209; 429/218.1; 429/400; 429/523; 429/533; 204/290.09; 204/290.13; 502/242; 502/246; 502/261; 502/263; 502/304; 502/326; 502/327; 502/332; 502/349; 502/350; 502/351; 502/355; 502/415; 502/439

(58) Field of Classification Search ................... 502/242, 502/246, 261, 263, 304, 326, 327, 332, 349, 502/350, 351, 355, 415, 439; 204/290.09, 204/290.13; 429/209, 218.1, 400, 523, 528, 429/533
See application file for complete search history.

(56) References Cited

U.S. PATENT DOCUMENTS

| 4,467,045 | A | * | 8/1984 | Fung ................. 502/35 |
| 4,472,515 | A | * | 9/1984 | Fung ................. 502/37 |
| 4,473,656 | A | * | 9/1984 | Fung et al. ............. 502/35 |
| 4,480,046 | A | * | 10/1984 | Fung et al. ............. 502/35 |
| 4,490,477 | A | * | 12/1984 | Hobbs .............. 502/243 |
| 4,491,635 | A | * | 1/1985 | Fung et al. ............. 502/37 |
| 4,491,636 | A | * | 1/1985 | Fung et al. ............. 502/37 |
| 4,513,102 | A | * | 4/1985 | Hutchings et al. ........... 502/325 |
| 4,545,886 | A |   | 10/1985 | De Nora et al. |
| 5,326,735 | A | * | 7/1994 | Itoh et al. .............. 502/177 |
| 5,821,190 | A | * | 10/1998 | Kurabayashi et al. ........ 502/178 |
| 5,861,222 | A |   | 1/1999 | Fischer et al. |
| 6,200,457 | B1 | * | 3/2001 | Durand et al. ................ 205/771 |
| 6,309,772 | B1 |   | 10/2001 | Zuber et al. |
| 6,500,217 | B1 |   | 12/2002 | Starz et al. |
| 6,972,087 | B2 | * | 12/2005 | Wolford et al. .............. 210/130 |
| 2003/0057088 | A1 |   | 3/2003 | Ichikawa et al. |
| 2004/0219420 | A1 | * | 11/2004 | Tada et al. ...................... 429/44 |

FOREIGN PATENT DOCUMENTS

| DE | 102 11 701 A1 | 9/2003 |
| GB | 1195871 | 6/1970 |
| JP | 10-273791 | 10/1998 |
| JP | 2001-219073 | 8/2001 |
| JP | 2003-293198 | 10/2003 |

OTHER PUBLICATIONS

Beck, Guenter, "Edelmetall-Taschenbuch, Chapter 8.3.3," 1995, pp. 409-413, Huethig-Verlag, Heidelberg, Germany.

Ioroi, T. et al., "$IrO_2$-deposited Pt electrocatalysts for unitized regenerative polymer electrolyte fuel cells," Journal of Applied Electrochemistry, 2001, pp. 1179-1183, vol. 31, Kluwer Academic Publishers, Netherlands.

Rasten, Egil et al., "Effect of Thermal Treatment of $IrO_2$ Anode Catalysts for PEM Water Electrolysis," Electrochemical Society Proceedings, 2001, pp. 151-164, vol. 2001-23, Norway.

Adams, Roger et al., Platinum Oxide as a Catalyst in the Reduction of Organic Compounds. III. Preparation and Properties of the Oxide of Platinum Obtained by the Fusion of Chloroplatinic Acid with Sodium Nitrate,' J. Am. Chem. Soc., Sep. 1923, pp. 2171-2179, vol. 45, United States.

* cited by examiner

Primary Examiner — Cam N. Nguyen
(74) Attorney, Agent, or Firm — Smith, Gambrell & Russell, LLP

(57) ABSTRACT

The invention is directed to iridium oxide based catalysts for use as anode catalysts in PEM water electrolysis. The claimed composite catalyst materials comprise iridium oxide ($IrO_2$) and optionally ruthenium oxide ($RuO_2$) in combination with a high surface area inorganic oxide (for example $TiO_2$, $Al_2O_3$, $ZrO_2$ and mixtures thereof). The inorganic oxide has a BET surface area in the range of 50 to 400 $m^2$/g, a water solubility of lower than 0.15 g/l and is present in a quantity of less than 20 wt. % based on the total weight of the catalyst. The claimed catalyst materials are characterized by a low oxygen overvoltage and long lifetime in water electrolysis. The catalysts are used in electrodes, catalyst-coated membranes and membrane-electrode-assemblies for PEM electrolyzers as well as in regenerative fuel cells (RFC), sensors, and other electrochemical devices.

13 Claims, No Drawings

PRECIOUS METAL OXIDE CATALYST FOR WATER ELECTROLYSIS

This application is a divisional of U.S. patent application Ser. No. 10/595,480, filed 8 Feb. 2007, now U.S. Pat. No. 7,976,989, which is herein incorporated by reference in its entirety, and claims the benefit of priority to PCT/EP2004/012290, filed 29 Oct. 2004, and DE 103 50 563.6, filed 29 Oct. 2003. U.S. patent application Ser. No. 10/595,480 is a 371 national stage entry of PCT/EP2004/012290, filed 29 Oct. 2004.

FIELD OF THE INVENTION

The present invention is directed to precious metal oxide catalysts, particularly to iridium oxide based catalysts for water electrolysis, regenerative fuel cells (RFC) or oxygen generating electrodes in various electrolysis applications. Furthermore, the use of these catalyst materials in electrodes, catalyst-coated membranes (CCMs) and membrane-electrode-assemblies (MEAs) for water electrolysers is disclosed.

BACKGROUND OF THE INVENTION

Hydrogen will become a major energy carrier in a future energy regime based on renewable resources. Water electrolysis is the most practical way to produce hydrogen using renewable resources. Investment and production costs of electrolysers define the total economy of the system and will determine whether this is to become a feasible process for hydrogen production. The production cost of hydrogen by water electrolysis is, to a large extent, affected by the electric power consumption, which can be about 70% of the total production costs of hydrogen.

Two different types of water electrolysers are commonly used in the state of the art: Alkaline electrolysers and PEM water electrolysers. Water electrolysers using a polymer electrolyte membrane ("PEM") along with precious metal catalysts are able to operate at considerably higher current densities and at lower specific energy consumption compared to conventional alkaline electrolysers giving the advantage of higher utilisation of the equipment and reduced production costs. In the best PEM electrolysers, a cell voltage of 1.67 V at 3 A/cm$^2$ has been obtained. This cell voltage is comparable to that of a modern alkaline electrolyser which typically is operating at 0.2 A/cm$^2$. This means that the alkaline electrolyser needs 15 times larger active area to produce the same amount of hydrogen at the same electrical power consumption compared to a PEM electrolyser system.

The present invention is therefore directed to improvements of catalysts for PEM water electrolysers.

In principle, PEM water electrolysers are built up similar to a PEM fuel cell, however, they are working in a different manner. During PEM fuel cell operation, oxygen reduction takes place at the cathode and hydrogen oxidation occurs at the anode of the fuel cell. In summary, water and electrical current is produced. In a PEM water electrolyser, the current flow and the electrodes are reversed and water decomposition takes place. Oxygen evolution occurs at the anode (abbreviated "OER"=oxygen evolution reaction) and reduction of protons (H+), which travel through the polymer electrolyte membrane, takes place at the cathode (abbreviated "HER"=hydrogen evolution reaction). As a result, water is decomposed into hydrogen and oxygen by means of current. The reactions can be summarized in the following equations:

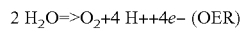

2 H$_2$O=>O$_2$+4 H++4e– (OER)

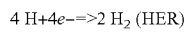

4 H++4e–=>2 H$_2$ (HER)

The PEM water electrolyser generally comprises a polymer electrolyte membrane (for example Nafion® by DuPont), which is sandwiched between a pair of electrode layers and a pair of porous current collectors (or gas diffusion layers) mounted respectively on both sides of the electrode layers.

In PEM fuel cell electrodes, platinum on carbon catalysts are used for both, the anode electrocatalyst (for hydrogen oxidation) and the cathode electrocatalyst (for oxygen reduction). In the PEM electrolyser, carbon based materials such as Pt/carbon catalysts and carbon-fiber based gas diffusion layers (GDLs) cannot be used at the anode side because of corrosion of carbon by the oxygen evolved during water electrolysis.

For the manufacture of a membrane-electrode-assembly for a PEM electrolyser, catalyst inks comprising catalyst powders, solvents and optionally polymer electrolyte (i.e. "ionomer") material is prepared and applied either directly to the membrane or to the gas diffusion layer and then contacted with the membrane. The manufacture of this assembly is similar to the manufacture of membrane-electrode-assemblies (MEAs) for PEM fuel cells, which is broadly described in the literature (see for example U.S. Pat. No. 5,861,222, U.S. Pat. No. 6,309,772 and U.S. Pat. No. 6,500,217).

Among all precious metals, platinum is the most active catalyst for the hydrogen evolution reaction (HER) at the cathode and can be applied at moderate loading. Iridium and iridium oxide is well known for its unique electrocatalytic properties in respect to chlorine and oxygen evolution processes (ref to DEGUSSA-Edelmetalltaschenbuch, Chapter 8.3.3, Huethig-Verlag, Heidelberg/Germany, 1995). Thus, iridium is the preferred material for the oxygen evolution reaction (OER) at the anode side, either in the form of pure metal or as oxide. However, for certain purposes, other precious metal oxides (preferably oxides of ruthenium or platinum) may be added.

In PEM water electrolysers, the precious metal catalyst loading on the anode and on the cathode is still relatively high, 3-5 mg p.m./cm$^2$ or more. Therefore there is a need for the development of improved catalysts with lower oxygen overvoltage and longer service life, which allows to reduce the catalyst loading of the electrolysers.

DESCRIPTION OF RELATED ART

GB 1 195 871 describes the use of thermally treated RuO$_2$ and IrO$_2$ compounds and their mixtures in activated titanium electrodes (so-called "DSA"®=dimensionally stable anodes). The products are widely used for chlorine production in the chlor-alkali electrolysis. The ruthenium and iridium oxides are deposited by a thermal decomposition process of liquid precursors onto an electrically conductive titanium metal substrate.

The deposition method by thermal treatment is not suitable for membrane-based PEM electrolysers because of the low thermal stability of the polymer electrolyte membrane. Furthermore, the liquid precursors would penetrate the membrane and contaminate the ionomer material. Furthermore, the addition of TiO$_2$ and various other inorganic oxides occurs "in-situ", i.e. before the formation of the precious metal oxide layer, a specific catalyst in powder form is not disclosed.

IrO$_2$/Pt electrocatalysts are reported by T. Ioroi et al [J. of Appl. Electrochemistry 31, 1179-1183 (2001) and J. of Electrochem. Soc. 147(6), 2018-2022 (2000)]. These catalysts were prepared in powder form by alkaline precipitation and subsequent thermal treatment. They do not contain any additional inorganic oxides.

US 2003/0057088 A1 is directed towards a PEM water electrolyser cell using an Ir—Ru oxide anode catalyst comprising at least one metal oxide selected from the group of iron (Fe), nickel (Ni) and cobalt (Co). These catalysts are to provide low oxidation overvoltages.

JP 10-273791 describes the preparation of $IrO_2$, $RuO_2$ and mixed $IrO_2/RuO_2$ catalysts for water electrolysis by hydroxide coprecipitation. Heat treatment is performed at 500° C. for 2 hours. This method was reproduced by the present inventors and it was found that the catalysts obtained according to this method comprise very coarse and agglomerated particles. As a result, the BET surface area of these catalysts is very low and their electrochemical activity is insufficient. Furthermore, the processing of these materials into catalyst inks as well as any subsequent coating and printing steps with such inks are very difficult.

The effect of thermal treatment of $IrO_2$ anode catalysts for PEM water electrolysis is described by E. Rasten et al. in *Proceedings Electrochemical Soc.*, Vol. 2001-23, page 151-164. The iridium oxide catalyst described therein is prepared according to the ADAMS fusion method [ref. to R. Adams and R. L. Shriner, *J. Am. Chem. Soc.* 45, 2171 (1923)]. This method consists of heating the chloride precursors (i.e. $IrCl_3$ or $H_2IrCl_6$) in a fused salt melt of sodium nitrate. The salt melt process creates a lot of toxic nitric oxide gases and must be performed in a batch process with low yields. Furthermore, the catalyst particles prepared by E. Rasten et al. according to the ADAMS method were very coarse and agglomerated. For the annealed $IrO_2$ catalyst a particle size of 30 to 100 nm is reported.

In DE 102 11 701 A1, a method for in-situ immobilisation of water-soluble nanosized metal oxide colloids is reported. Among others, bimetallic iridium oxide particles comprising a second metal from the side groups IIIb, IVb, Vb, VIb, VIIb, VIII, Ib or IIb of the Periodic system of the elements (PSE) are claimed. These catalysts may be immobilized on inorganic oxidic supports such as alumina, silica, magnesia or titania. In this rather generic disclosure, no details are given as to the type and properties of the inorganic support materials as well as to the quantity of the inorganic oxide present in the catalyst. Use of the catalysts for water electrolysis is not described.

SUMMARY OF THE INVENTION

It was the object of the present invention to provide improved precious metal oxide, particularly iridium oxide, based catalysts, which are suitable for use in PEM water electrolysis, reveal a low oxygen overvoltage, enable very low precious metal loadings and can be manufactured in environmentally safe processes. Furthermore, the catalysts have to show a long lifetime and should enable a high endurance of the PEM electrolyzer unit.

To achieve the above-cited objects, improved iridium oxide based catalysts as defined in the claims of the present invention are provided.

The claimed catalysts are composite catalyst materials and comprise of iridium oxide ($IrO_2$ and/or $Ir_2O_3$) and optionally ruthenium oxide ($RuO_2$, and/or $Ru_2O_3$) in combination with a high surface area inorganic oxide (for example $TiO_2$, $Al_2O_3$, $ZrO_2$ and mixtures thereof). The iridium oxide of the present invention comprises predominantly of iridium(IV)-oxide ($IrO_2$), however, various amounts of iridium(III)-oxide ($Ir_2O_3$) may be present. The term "composite catalyst" means that the catalyst contains the iridium oxide particles finely deposited on or dispersed around the inorganic oxide material.

The claimed materials are used as anode catalysts in PEM electrolysers and reveal a very low oxygen overvoltage in water electrolysis (i.e. a low onset potential for oxygen evolution) and lead to a lower specific energy consumption per volume of hydrogen produced. Thus they offer higher hydrogen production rates at a given cell voltage. In summary, they can electrolyse water at a lower voltage than conventional iridium oxide based catalysts, which do not contain a high surface area inorganic oxide. The catalyst-coated membranes ("CCMs") and membrane-electrode-assemblies ("MEAS") for PEM water electrolysers manufactured by use of the claimed precious metal oxide catalysts show improved performance vs. the state of the art materials.

As a consequence, smaller and cheaper electrolyser systems can be designed with less consumption of extensive materials, such as ionomer membranes, precious metals and bipolar plates.

DETAILED DESCRIPTION OF THE INVENTION

The present invention is directed to precious metal oxide catalysts comprising iridium oxide and optionally ruthenium oxide and a high surface area inorganic oxide. If $RuO_2$ is present, the atomic ratio of Ru/Ir is in the range of 4/1 to 1/4, preferably about 1/1.

The iridium oxide of the present invention comprises predominantly of iridium(IV)-oxide ($IrO_2$), however, depending on the manufacturing process, various amounts of iridium(III)-oxide ($Ir_2O_3$) may be present. The ruthenium oxide may be present as ruthenium(IV)-oxide, but ruthenium(III)-oxide may also be present in minor amounts.

Generally, $IrO_2$ and $RuO_2$ are electrically conductive oxide materials. To obtain optimum catalyst performance, it was found that the concentration of the inorganic oxide must be limited to a maximum value of 20 wt. %, based on the total weight of the catalyst. If the amount of inorganic oxide is higher than 20 wt. %, the electrical conductivity of the catalyst and the electrode is impaired. Thus, the inorganic oxide is added in a quantity less than 20 wt. %, preferably less than 10 wt. % and most preferably less than 7.5 wt. %, based on the total weight of the catalyst.

The presence of a high surface area inorganic oxide in the catalysts of the invention improves their performance and lifetime in water electrolysis. To achieve best results, it was found that the BET surface area of the inorganic oxide should be in the range of 50 to 400 $m^2/g$, preferably in the range of 100 to 300 $m^2/g$ (BET surface areas measured according to DIN 66132).

The inorganic oxides should be inert and should have a very low solubility in water and in an acidic environment. This is important for a long lifetime and high endurance of the PEM electrolyzer unit. Typically, the water solubility of the inorganic support materials should be lower than 0.15 g/l (<150 mg/l), preferably lower than 0.05 g/l (<50 mg/l). The water solubility is determined according to EN ISO 787, part 8 at a temperature of 20° C. Higher solubility values lead to a gradual elution of the inorganic oxide from the catalyst during operation. The catalyst particles are then prone to agglomerate. This can lead to a loss of active surface area and can result in a degradation of the catalyst activity.

Suitable inorganic oxides are pyrogenic ("fumed") oxides such as $TiO_2$, $SiO_2$ or $Al_2O_3$, manufactured by Degussa AG, Duesseldorf. The preferred $TiO_2$ material is in the anatase modification and is manufactured by Sachtleben Chemie GmbH (Duisburg) under the product name "Hombifine N". The preferred $Al_2O_3$ material is Puralox, manufactured by Sasol Germany GmbH (Brunsbuettel). Other examples for suitable oxide supports are $Nb_2O_5$, $SnO_2$, doped tin oxide ($SnO_2/F$), $ZrO_2$, $CeO_2/ZrO_2$ and mixtures and combinations thereof.

In a typical preparation process, the high surface area inorganic oxide is thoroughly dispersed in an aqueous solution. Then the iridium precursor compound (Hexachloroiridium (IV) acid, Ir(III)-chloride or Ir-nitrate etc.) is added. The suspension is then heated to 70-100° C. and $IrO_2$ is subsequently precipitated by controlled addition of alkali to adjust the pH in a range of 6 to 10. After filtration and washing, the catalyst is dried and calcined. The resulting catalyst is very active, has a high surface area, a very low degree of agglomeration and can be easily dispersed in a catalyst ink for subsequent coating processes.

For the preparation of mixed Ir/Ru oxide catalysts, the above-cited process is modified and suitable Ir and Ru precursor compounds are jointly added to the suspension of the inorganic oxide in water. Suitable Ru-compounds are $RuCl_3$-Hydrate, Ru(III)-nitroysl-nitrate, Ru(III)-acetate and the like.

The heat treatment of the catalyst materials is performed in suitable batch or belt furnaces under air, reducing or inert atmospheres. Typical calcination temperatures are in the range of 300 to 800° C., preferably in the range of 300 to 500° C. Typical calcination times are 30 to 120 mins.

In the manufacturing process described above, the iridium oxide particles are precipitated in very fine, nano-sized form (i.e. highly dispersed) on or at the surface of the inorganic oxide. If the surface area of the inorganic oxide is sufficiently high, the dispersion of the precious metal oxide particles remains stable during the subsequent thermal treatment process and sintering of the particles is prohibited. This results in a high BET surface area of the final catalyst, which in turn leads to high activity and stability. Optimum electrochemical performance results were obtained when the BET surface area of the final iridium oxide catalyst is in the range of 40 to 100 $m^2/g$.

If the inorganic oxide is omitted, coarse, agglomerated particles with a low surface area are obtained, resulting in a poor electrochemical activity (ref to comparative example).

For manufacture of electrodes, catalyst-coated membranes (CCMs) and membrane-electrode-assemblies (MEAs), the iridium oxide catalysts are processed into inks or pastes by adding suitable solvents and optionally ionomer materials. The catalyst inks may be deposited onto gas diffusion layers (GDLs), current collectors, ionomer membranes, blank PTFE sheets, release papers or separator plates and the like by spraying, printing, doctor-blading or other deposition processes. Usually, a drying process is subsequently applied to remove the solvents of the catalyst ink. In catalyst-coated membranes and MEAs for PEM water electrolysers, the claimed catalyst materials are applied to the anode side of the MEA. The typical loading is in the range of 0.5 to 2.5 mg p.m./$cm^2$. On the cathode side, standard Pt catalysts (for example Pt/C or Pt-Black) are used. The cathode loadings are in the range of 0.2 to 1 mg Pt/$cm^2$.

The electrochemical properties of the catalyst materials are determined by the measurement of the onset potential (in V) for oxygen evolution and the current density (in mA/$cm^2$) at 1.5 V vs. NHE (in mA/mg). In these tests, the catalyst samples are dispersed in a 5 wt-% alcoholic solution of Nafion® (Aldrich) and fixed on a glassy carbon electrode. Cyclic voltammograms are taken in sulfuric acid (c=0.5 mol/l) at room temperature. Counter electrode is Pt, reference electrode is $Hg/Hg_2SO_4$ (Metrohm), scan speed is 10 mV/s. The fifth scan of voltammograms is taken to generate quasi-stationary conditions.

The electrochemical activity is determined by two parameters (i) the onset of oxygen evolution and (ii) the current at a constant voltage of 1.5 V vs. NHE. The onset of oxygen evolution is determined by linear extrapolation from a logarithmic plot of the potential (V vs. NHE, y-axis) vs. the current (mA/mg, x-axis).

The invention is illustrated but not limited by the following examples and the comparative example.

EXAMPLES

Example 1

Preparation of $IrO_2/TiO_2$ (5 wt. %)

378.8 milligrams of titanium dioxide (Hombifine N, Sachtleben Chemie GmbH); BET>300 $m^2/g$, water solubility<0.01 g/l at 20° C.) are added to a 1 liter beaker containing 112.5 ml of deionized water under vigorous stirring. Next, 29.7 grams of a hexachloroiridium acid solution ($H_2IrCl_6$, 24.3 wt. % Ir; Umicore, Hanau/Germany) are added to the suspension under stirring and diluted with 50 ml of deionized water. The suspension is then heated to 70° C. After reaching the temperature, 50 ml of a 0.1 M NaOH-solution are added and diluted with further 500 ml of deionized water.

The final pH of 7.0 is adjusted using 10 wt. % NaOH. Temperature and pH are kept at the same level for about 4 hours Finally the product is isolated by filtration and washed with 2 liters of deionized water. The catalyst is dried in an vacuum oven overnight. The product is then calcined at 400° C. in an box oven in air. The BET surface area remains very high at 66 $m^2/g$, thus indicating the excellent catalytic activity of the material. Table 1 summarizes the characteristic data of the catalyst.

Example 2

Preparation of $IrO_2/Al_2O_3$ (5 wt. %)

378.8 milligrams of alumina (Puralox SCFa-140, Sasol Germany GmbH, Brunsbuettel; BET=141 $m^2/g$) are added to a 1 liter beaker containing 112.5 ml of deionized water under vigorous stirring. Next, 29.7 grams of a hexachloroiridium acid solution ($H_2IrCl_6$, 24.27 wt. % Ir; Umicore, Hanau/Germany) are added to the suspension under stirring and diluted with 50 ml of deionized water. The suspension is then heated to 70° C. After reaching the temperature, 50 ml of a 0.1 M NaOH solution are added and diluted with further 500 ml of deionized water.

The final pH of 7.5 is adjusted using 10 wt % NaOH. Temperature and pH are kept at the same level for about 4 hours. Finally the product is isolated by filtration and washed with 1.5 liters of deionized water. The catalyst is dried in an vacuum oven overnight. The product is then calcined at 400° C. in an box oven in air for 1 hour. The BET surface area remains very high at 59 $m^2/g$, thus indicating the excellent catalytic activity of the material.

Comparative Example

Preparation of $IrO_2$ (without Inorganic Oxide)

150 ml of deionized water are poured into a 2 liter beaker. 24.86 grams of Hexachloroiridiumacid-hydrate (38.65% wt. Ir; Umicore Hanau/Germany) are dissolved in 50 ml of deionized water. The solution is added to the beaker under vigorous stirring and diluted with 50 ml of deionized water two times. The solution is heated to 70° C. After having reached the temperature, 4 grams of NaOH are dissolved in 50 ml of deionized water and added to the solution under stirring.

The reaction solution is diluted with 500 ml of deionized water and a pH of 7.0 is adjusted by using 10% wt. NaOH. Temperature and pH are kept at the same level for 4 hours. Finally the product is isolated by filtration and washed with 1 l of deionized water. The catalyst is dried in an vacuum oven at 100° C. overnight. The material is heat treated at 400° C. The BET surface area is lowered due to the absence of the inorganic oxide. Characteristic data are given in table 1.

TABLE 1

| Parameter | Example 1 | Comparative Example |
|---|---|---|
| BET [$m^2/g$] | 66 | 37 |
| Onset-potential for the oxygen evolution [V] | 1.47 | 1.65 |
| Current density at 1.5 V vs. NHE [mA/mg] | 1.48 | 0.23 |

When compared to example 1 (representing the invention), the comparative example shows a very high onset potential for oxygen evolution (1.65 V vs. 1.47 V of example 1).

This results in the fact that the current density at the given cell voltage of 1.5 V is very low (0.23 mA/mg vs. 1.48 mA/mg of example 1). The data clearly demonstrate the superior characteristics of the catalysts of the present invention.

The invention claimed is:

1. A composite catalyst comprising precipitated iridium oxide particles deposited on or at the surface of inorganic oxide particles present in a quantity of less than 20 wt. % based on the total weight of the composite catalyst prepared by a process which comprises the steps of:
   a) making a mixture by dissolving an iridium precursor compound and optionally a ruthenium precursor compound in an aqueous solution containing inorganic oxide particles,
   b) adjusting the pH of the mixture to be in the range of 6 to 10 to precipitate out iridium oxide particles and optionally ruthenium oxide particles such that the iridium oxide particles and optionally the ruthenium oxide particles are deposited or dispersed on or at the surface of the inorganic oxide particles,
   c) separating and drying the inorganic oxide particles having the precipitated iridium oxide and optionally ruthenium oxide particles deposited thereon or dispersed around, and
   d) heat treating the inorganic oxide particles at temperatures in the range of 300 to 800° C. to obtain the composite catalyst,
   wherein the iridium oxide particles comprise iridium(IV)-oxide, iridium(III)-oxide or mixtures thereof.

2. The composite catalyst of claim 1, wherein the inorganic oxide particles have a BET surface area in the range of 50 to 400 $m^2/g$.

3. The composite catalyst of claim 1, wherein the inorganic particles have a BET surface area in the range of 100 to 300 $m^2/g$.

4. The composite catalyst according to claim 1, further comprising ruthenium oxide in an amount resulting in an Ir/Ru-atomic ratio in the range of 4/1 to 1/4.

5. The composite catalyst according to claim 1, wherein the inorganic oxide particles are selected from the group consisting of titania ($TiO_2$), silica ($SiO_2$), alumina ($Al_2O_3$), zirconia ($ZrO_2$), tin dioxide ($SnO_2$), doped tin oxide ($SnO_2/F$), ceria, $CeO_2/ZrO_2$, niobium pentoxide ($Nb_2O_5$), tantalum pentoxide ($Ta_2O_5$) and combinations thereof.

6. The composite catalyst according to claim 1, wherein the water solubility of the inorganic oxide particles, as determined according to EN ISO 787, part 8, is lower than 0.15 g/l, at 20° C.

7. The composite catalyst according to claim 1, wherein the water solubility of the inorganic oxide particles, as determined according to EN ISO 787, part 8, is lower than 0.05 g/l at 20° C.

8. The composite catalyst according to claim 1, wherein the inorganic oxide particles are present in a quantity of less than 10 wt. % based on the total weight of the composite catalyst.

9. An article of manufacture comprising the composite catalyst according to claim 1 as an anode catalyst in an electrode.

10. A catalyst-coated membrane (CCM) comprising the composite catalyst according to claim 1.

11. A membrane-electrode assembly (MEA) for PEM water electrolysis containing the composite catalyst according to claim 1.

12. An article of manufacture selected from the group consisting of a regenerative fuel cell (RFC), a sensor and an electrolyser containing the composite catalyst according to claim 1.

13. A composite catalyst consisting of precipitated iridium oxide particles deposited on or at the surface of inorganic oxide particles present in a quantity of less than 20 wt. % based on the total weight of the composite catalyst prepared by a process which comprises the steps of:
   a) making a mixture by dissolving an iridium precursor compound in an aqueous solution containing inorganic oxide particles,
   b) adjusting the pH of the mixture to be in the range of 6 to 10 to precipitate out iridium oxide particles such that the iridium oxide particles are deposited or dispersed on or at the surface of the inorganic oxide particles,
   c) separating and drying the inorganic oxide particles having the precipitated iridium oxide particles deposited thereon or dispersed around, and
   d) heat treating the inorganic oxide particles at temperatures in the range of 300 to 800° C. to obtain the composite catalyst,
   wherein the iridium oxide particles comprise iridium(IV)-oxide, iridium(III)-oxide or mixtures thereof.

* * * * *